United States Patent Office 3,238,263
Patented Mar. 1, 1966

3,238,263
CALCIUM SALTS OF BRIDGED PHENOLS
Alan A. Schetelich, Cranford, and Charles S. Lynch, Plainfield, N.J., assignors to Esso Research and Engineering Company, a corporation of Delaware
No Drawing. Filed Dec. 31, 1962, Ser. No. 248,273
6 Claims. (Cl. 260—609)

This invention relates to a new process for preparing calcium derivatives of bridged phenols or their derivatives, to the products thus prepared, and to uses thereof.

This application is a continuation-in-part of Serial No. 101,669, filed April 10, 1961, and abandoned subsequent to the filing of the present application.

Metal salts of bridged phenols have been widely described in the art, as for example in U.S. Patents 2,472,504 and 2,461,335, and they have been added to oils to serve as oxidation inhibitors, detergents, dispersants, detergent-inhibitors, and the like. In general, the alkaline earth metal salts have been preferred. While the reaction with barium base goes easily to completion, converting essentially about 100% of the phenol groups into the barium metal derivatives, it has not been possible heretofore to prepare satisfactory salts of bridged phenols containing solely calcium metal. For some unknown reason it is extremely difficult to convert all of the phenolic groups into the calcium metal derivative. This phenomenon is disadvantageous because for many additive uses, such as detergents and detergent-inhibitors, a high ratio of metal to bridged phenol is particularly desirable. In order to obtain suitable alkaline earth metal salts containing at least some calcium, the customary procedure has been to react the bridged phenol with calcium in the form of an oxide or other suitable base, converting as many of the phenolic groups into the metal derivatives as possible (usually only about 70 to 75% conversion), and then to complete the preparation by reacting the calcium-containing reaction mixture with a barium metal base. This type of combination barium-calcium metal salt of alkyl bridged phenol has found great acceptance as an additive for formulating lubricants for diesel engines, particularly railroad diesel engines.

Although the all-barium additives or those containing barium and calcium in combination can meet the required standards of a railroad diesel lubricant, operators of railroad diesel engines have been highly desirous of obtaining lubricants containing additives of equivalent value comprising all-calcium derivatives of bridged phenols. The reason for this is fourfold. First, experience indicates that barium-containing additives result in increased valve deposit conditions as compared with calcium-containing additives. Secondly, these barium deposits tend to be thrown off as long-glowing, red-hot sparks, thus leading to right-of-way fires. On the contrary, calcium deposits when thrown off do not glow long enough to cause fires. Thirdly, calcium is considerably less expensive than barium on a mole basis. Fourthly, calcium-containin gadditives have a lower ash content than barium-containing additives on a mole basis. Thus, it is desirable to prepare an all-calcium salt of a bridged phenol which can be formulated into a lubricant having the ability to meet the same railroad diesel specifications as lubricants containing the barium salts.

Accordingly, it has been found and forms the substance of this invention that by utilizing certain reactants and conditions, calcium salts of bridged alkyl phenols can be obtained in which essentially 100% of the phenolic groups have been converted into calcium derivatives.

Briefly the process of the invention is as follows. An all-calcium salt of a bridged phenol can be prepared by reacting a reaction product of a calcium base, preferably $Ca(OH)_2$, and hydrogen sulfide with at least a portion of the hydroxy groups of the bridged phenol. The reaction between the reaction product and the bridged phenol is generally carried out at temperatures of about 0° F. to 150° F., preferably 50° to 150° F., for about 10 to 120 minutes. It is believed that the major product obtained in the reaction between $Ca(OH)_2$ and $H_2S$ is $Ca(SH)_2$. When the product is crystallized, the formula is $$Ca(SH)_2 \cdot 6H_2O$$

As $Ca(SH)_2$ tends to decompose upon exposure to air but is quite soluble in water or alcohol, the preferred method of conducting the reaction between $Ca(SH)_2$ and an alkyl phenol is to employ a polar solvent containing hydroxy substituents such as water or a $C_1$–$C_8$, or more particularly a $C_1$–$C_4$, aliphatic alcohol. The solvent can be removed by suitable methods, such as distillation, at the end of the reaction and the product can be dried more thoroughly by blowing at an elevated temperature with an inert gas. While complete solvent removal is not always essential, it is preferred that the solvent concentration not exceed about 2 wt. percent. Inert gases for solvent removal include argon, neon, light hydrocarbon gases, and preferably $N_2$. In most instances, $CO_2$ should not be used for this purpose because the presence of carbonates in the final product may be detrimental to silver-steel lubricity. After blowing, the product may be further purified by treatment with conventional filter aids such as Hyflo (a diatomite).

The calcium hydrosulfide ($Ca(SH)_2$) can be conveniently prepared by bubbling $H_2S$ into a solution of the hydroxy-containing polar solvent and $Ca(OH)_2$. The $Ca(OH)_2$ may be dispersed in any quantity up to and exceeding its solubility in the hydroxy-containing polar solvent. While $Ca(OH)_2$ is sparingly soluble in alcohol and water, solubility is increased as the temperature is lowered. When relatively large yields of $Ca(SH)_2$ are desired a milk of lime suspension can be used. This suspension has more $Ca(OH)_2$ present than will dissolve. After the reaction mixture is $H_2S$ saturated, it is preferably filtered although it can be used as is, because $Ca(SH)_2$ is much more soluble than $Ca(OH)_2$.

An alternative method of obtaining $Ca(SH)_2$ is from the hydrolysis of CaS. Thus, $$2\ CaS + 2H_2O \rightarrow Ca(SH)_2 + Ca(OH)_2$$

$H_2S$ can be bubbled through this reaction mixture to obtain a greater yield of the $Ca(SH)_2$.

The bridged phenols of this invention are aromatic compounds having at least one hydroxy group per aromatic group, where the aromatic compounds are connected by a bridging group. The substituent atoms of the bridging group are selected from the class of elements consisting of hydrogen, carbon, sulfur, oxygen, halogen, nitrogen and silicon. Preferably the substituent atoms of the bridging group are selected from the class of carbon and sulfur. The bridging group will have at least two of its valences satisfied by carbon atoms (i.e., satisfied by a carbon atom from each of two aromatic compounds, e.g., benzene rings, which rings also contain at least one acidic or phenolic hydroxyl radical). Valences in excess of two in the common bridging group may be satisfied by hydrogen, carbon, nitrogen, oxygen or halogen atoms.

The bridged phenols for use in accordance with this invention may be represented by the following formula:

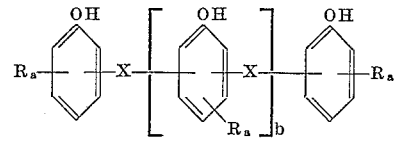

wherein R is a monovalent substituent selected from the group consisting of halogen atoms and hydrocarbon groups having from 1 to 30, preferably 4 to 18, carbon atoms, $a$ is an integer from 0 to 2, $b$ is an integer from 0 to 10 and X is a divalent bridging group having atoms selected from the group consisting of hydrogen, carbon, sulfur, oxygen, halogen, nitrogen and silicon, and wherein the bridging linkages are joined to atoms selected from the group consisting of sulfur and carbon.

An example wherein X has bridging linkages joined to carbon is methylene:

X may be a divalent alkylidene group having from 1 to 16 carbon atoms, for example, methylene, ethylidene, 2,2-propylidene, 1,1-octylidene, etc. R may be an alkyl, aryl or aralkyl group having from 1 to 30 carbon atoms, for example methyl, amyl, iso-octyl, dodecyl, or a halogen, for example chlorine or bromine. Specific examples of compounds thus represented by the formula are:

Bis(4-hydroxyphenyl) methane
2,2-bis(4-hydroxyphenyl) propane
Bis(4-hydroxytolyl) butane
Bis(2-hydroxy-5-nonylphenyl) methane
Bis(2-hydroxy-5-octylphenyl) octane
2,2-bis(3-chloro-4-hydroxyphenyl) propane When the bridging group X has sulfur as a bridging atom, the divalent linkage can be, for instance, a sulfide (—S—), a disulfide (—S—S—), a sulfoxide (—SO—) or sulfone (—SO$_2$—).

Specific examples of phenolic compounds with a bridging sulfur atom include bis(4-hydroxyphenol) sulfide, bis(2-hydroxy-5-nonylphenyl) sulfoxide and bis(4-hydroxytolyl) sulfone. In addition to such pure compounds, mixed alkyl phenol sulfides and sulfoxides and sulfones derived from them are included within the scope of this invention. The alkyl phenol sulfides are mixtures thought to contain in addition to simple sulfides, i.e., the simple thioethers of the alkylated phenols, a substantial portion of molecules having more than two phenol groups which are interconnected or bridged by sulfur atoms. They may be produced by treating alkylated phenols with sulfur dichloride according to the teachings of U.S. 2,362,289–93 and by other methods familiar to those skilled in the art. Alkyl phenol disulfides can be prepared by a similar reaction with sulfur monochloride. The alkyl phenol sulfides and particularly those having alkyl groups of 4 to 18 carbon atoms are preferred among the sulfur bridged phenols of this invention. Specific examples of these preferred materials include nonyl phenol sulfide, isobutyl phenol sulfide, hexadecyl phenol sulfide, octadecyl phenol sulfide, t-amylphenol sulfide, tert. octyl phenol sulfide, and dodecyl phenol sulfide. The metal salts of alkyl phenol sulfides containing between 0.85 and 1.4 moles of sulfur per mole of alkyl phenol are highly soluble in oil and extremely useful in forming the material of this invention when it is to be used in liquid lubricants and greases.

Nonyl phenol sulfide is especially preferred because of its easy availability and the fact that the length of the alkyl chain seems to be the optimum for detergency and inhibitor effects. Nonyl phenol sulfide may be abbreviated conveniently to NPS. Although it is realized that nonyl phenol sulfide also contains mixtures of related compounds as impurities, the terms NPS will be used for purposes of simplicity.

The preferred method of conducting the reaction of the invention is to employ more than the theoretical amount of calcium needed to completely react with all of the phenolic groups in the bridged phenol to be converted to the metal derivative. Thus it is preferred that from 1 to 10 equivalents of calcium be present for every OH group. In some instances it is not desired that every OH group be converted and in such an event from 0.1 to 1 equivalent of calcium can be reacted per OH group. The temperatures of reaction are not critical. In general, the reaction mixture is brought to reflux temperature and held there for 10–200 minutes. Then the polar solvent is distilled off. This procedure insures that the reaction is driven to completion and that the polar solvent is removed from the reaction product.

While satisfactory products can be obtained by reacting the bridged phenols directly with Ca(SH)$_2$, it is preferred to employ a 2-stage process. The bridged phenol is first reacted with a calcium base such as CaO or Ca(OH)$_2$, to convert as many hydroxy groups to the metal derivatives as possible. From 0.5 to 10 equivalents of calcium base per phenolic hydroxy group are reacted in this stage, using the same general reaction conditions as in the reaction with Ca(SH)$_2$. The unreacted hydroxy groups remaining after this reaction are then converted to the metal derivatives by reaction with a Ca(SH)$_2$ solution.

It is convenient to prepare the additives of this invention in the form of concentrates containing 20 to 70 wt. percent of the calcium salt in a hydrocarbon oil. This not only facilitates the preparation in many cases but also simplifies the later operation of blending the additive into a finished lubricant.

The calcium salts of the invention can be added in amounts of from 0.1 to 20, and more preferably 0.5 to 10 wt. percent, to lubricating oils. These oils can be straight mineral lubricating oils or distillates derived from paraffinic, naphthenic, asphaltic, or mixed base crudes or, if desired, various blended oils may be employed as well as residuals, particularly those from which asphaltic constituents have been carefully removed.

Also, synthetic lubricating oils may be employed in the invention. These include synthetic hydrocarbon oils as well as synthetic ester oils, including dibasic acid esters such as di-2-ethyl hexyl sebacate, glycol esters such as C$_{13}$ oxo acid diesters of tetraethylene glycol. Other synthetic oils include fatty acid esters, complex esters, esters of phosphoric acid, halocarbon oils, sulfite esters, carbonate esters, mercaptals, formals, polyglycol type synthetic oils, or mixtures of any of the above in any proportions. Also, mixtures of synthetic and mineral lubricating oils in any proportions may be employed.

Other additives, of course, may be added to the carrier medium composition of the present invention in order to form a finished lubricant. Such additives include oxidation inhibitors such as phenothiazine, phenyl-alpha-naphthylamine, thiophosphates or P$_2$S$_5$-treated terpenes; pour point depressants such as copolymers of vinyl acetate with fumaric acid esters of coconut oil alcohols; viscosity index improvers such as polyisobutylene, polymethacrylates; and the like.

The invention will be further understood by the following examples.

*Example 1*

The bridged phenol of this example was in the form of a hydrocarbon oil solution containing 60 wt. percent of nonyl phenol sulfide (NPS) having a 0.9 molar ratio of sulfur to nonyl phenol. The bridged phenol was prepared by first alkylating phenol with propylene trimer and then conventionally bridging by means of sulfur dichloride as taught in the example of U.S. 2,785,131 using base oil A.

A calcium nonyl phenol sulfide intermediate was prepared by mixing 1865 grams of the NPS solution in oil and 195 grams of a mixture of 91 vol. percent isopropyl alcohol and 9 vol. percent water. This mixture was heated to 140° F. At this temperature 90 grams of Ca(OH)$_2$ was added with stirring to the mixture over a period of about 15 minutes. Heat input was increased so that the alcohol was distilled off and the temperature increased to 250° F. in about 60 min. The mixture was held at 250° F. for 10 minutes and then filtered. The product contained 2.2 wt. percent calcium.

A Ca(SH)$_2$ solution was prepared by blending 500 grams of Ca(OH)$_2$ with 2960 grams of methanol and then bubbling H$_2$S into the mixture until the reaction was complete. The reaction product was then filtered. The product contained 7.6% calcium by weight.

A 116 gram portion of the nonyl phenol sulfide intermediate prepared as above was placed in a 2-liter, 4-necked flask equipped with a stirrer, thermometer, gas sparger, and reflux condenser. To this was added 140 grams of the above-described Ca(SH)$_2$ solution containing 7.6 wt. percent calcium. The resulting mixture was refluxed at about 150° F. for 30 minutes and then the alcohol was subsequently removed by distillation. The product was dried at 300° F. with N$_2$ blowing before filtering through Hyflo filter aid. The product contained 2.9 wt. percent calcium.

Example 2

In order to demonstrate the utility of the all-calcium nonyl phenol sulfide as a lubricating oil additive, tests were performed as follows.

Three lubricant compositions were prepared and labeled Compositions A, B, and C. Composition A was prepared from 5.2 vol. percent of a commercial calcium-barium nonyl phenol sulfide concentrate in oil and 94.8 vol. percent of a lubricating oil base; Composition B was prepared from 6.0 vol. percent of a blend of 37 vol. percent of a commercial calcium synthetic sulfonate oil concentrate and 63 vol. percent of a commercial calcium-barium nonyl phenol sulfide oil concentrate and 94.0 vol. percent of a lubricating oil base; Composition C was prepared from 5.2 vol. percent of the oil concentrate product of Example 1 and 94.8 vol. percent of a lubricating base oil. The lubricating oil base used in preparing these compositions was a severely hydrofined and phenol extracted naphthenic oil having the following inspections:

Gravity _____ API__ 24.5
Viscosity at 100 ° F. _____ SUS__ 900
V.I. _____ 61

All three blends had the same concentration of metal equivalents. These lubricating compositions were subjected to various lubricant stability tests. These tests were (1) the oxidation stability test, (2) silver corrosion tests, (3) copper-lead corrosion tests, (4) silver lubricity tests, and (5) a determination of the total base number for each lubricating composition according to ASTM–D–664.

The oxidation stability test was conducted by submerging a weighed silver bearing insert and a weighed copper-lead bearing insert in each of the lubricating compositions. The oil bath was stirred and air was blown through the bath at a rate of 2 cubic feet per hour. The temperature was kept at a constant 342° F. At the end of 19 hours and 23 hours, respectively, the viscosity of the bath was tested to ascertain the viscosity increase. The viscosity at 100° F. was measured in Saybolt Universal seconds (SUS).

The silver corrosion tests and copper-lead corrosion tests were performed as follows. At the end of 23 hours in the oxidation stability test the silver bearing insert and the copper-lead bearing inserts were weighed, and the weight loss for each bearing was ascertained.

The silver lubricity test is based on the data obtained in the kinetic oiliness testing machine (KOTM) described in U.S. Patent 2,909,056 and in the three-disc silver wear test. The kinetic oiliness testing machine has a rotating friction element with two annular tracks. The lubricant is fed to the friction element tracks, which are contacted with three equally spaced, circular friction buttons on the tracks. A constant load of 50 lbs. is maintained between the friction buttons, which are silver, and the tracks, which are 1020 steel. Rotational speed is 20 r.p.m. The temperature of the lubricant at the contact points is gradually increased from 70° F. to 375° F. The torque imposed upon the head by the buttons can be read directly from a gauge. To pass the test satisfactorily a lubricant must show a relatively low torque at a reference temperature of 375° F.

The three-disc silver wear test is designed to measure the silver wear prevention characteristics of lubricants when silver is used as a bearing surface for steel. The test consists of rotating a steel ball at 600 r.p.m. on three stationary silver discs under a constantly applied load of 15 kg. in the presence of the test lubricant at a temperature of 150° C. Torque is measured after 1 minute of operation and every 3 minutes thereafter up to a total test time of 15 minutes. The apparatus used to carry out this test is a precision Shell 4-Ball Wear Tester with a modified holder for three silver discs. The modified holder replaces the one that is normally used to hold the three stationary balls. In order to pass this test a lubricant must show a relatively low equilibrium torque value after 15 minutes of testing.

The results of these tests as well as the total base number of each of the lubricant compositions ascertained according to ASTM–D–664 are summarized in the following table.

TABLE I

| | Compositions | | |
|---|---|---|---|
| | A | B | C |
| Lubricant Conc., Vol. percent: | | | |
| Lubricating Oil Base_____ | 94.8 | 94.0 | 94.8 |
| Calcium-barium nonyl phenol sulfide concentrate_____ | 5.2 | | |
| 62 vol. percent calcium-barium nonyl phenol sulfide concentrate_____ | | 6.0 | |
| 37 vol. percent calcium synthetic sulfonate concentrate_____ | | | |
| Additive concentrate of Example 1_____ | | | 5.2 |
| Inspections on Blends: | | | |
| Total Base No. D–664_____ | 3.7 | 2.5 | 5.2 |
| Ba, Wt. percent_____ | 0.13 | 0.08 | |
| Ca, Wt. percent_____ | 0.11 | 0.11 | 0.165 |
| Lubricant Stability Test: | | | |
| Oxidation Stability (viscosity increase, SUS @ 100° F.)— | | | |
| 19 Hours_____ | 233 | 310 | 264 |
| 23 Hours_____ | 372 | 481 | 381 |
| Silver Corrosion, BWL¹, mg_____ | 0.3 (pass) | 1.0 (pass) | 0.4 (pass) |
| Copper Lead Corrosion, BWL¹, mg_____ | 174 | 321 | 153 |
| Silver Lubricity Test: | | | |
| 3-Disc Equilibrium Relative Torque_____ | 2,600 (pass) | 2,000 (pass) | 2,200 (pass) |
| KOTM Relative Torque at 375° F_____ | 50 (pass) | 41 (pass) | 35 (pass) |

¹ Bearing weight loss.

The data show that in the oxidation stability portion of the Lubricant Stability Test the all-calcium additive formulation (Composition C) gave results comparable to those of the barium additive formulation of Composition A and substantially superior to those of the barium-calcium additive formulation (Composition B). All three compositions contained equivalent moles of metal. The test data also show Composition C to be comparable to or better than Compositions A and B in silver bearing corrosion and copper-lead bearing corrosion. The KOTM and 3-disc test data show Composition C to be acceptable and at least equivalent to Compositions A and B in silver lubricity. It will be seen from the inspections of the compositions that Composition C contains calcium as the only metal, and that it has a higher base number than either Composition A or B.

Example 3

To prepare an all-calcium nonyl phenol sulfide concentrate from NPS, 2297 grams of the NPS solution described in Example 1 and 953 grams Ca(SH)$_2$ solution prepared according to Example 1 were placed in a 5-liter flask equipped with stirrer, thermometer, gas sparger and reflux condenser. The mixture was refluxed at 150° F. for 60 minutes. The alcohol was then distilled off and the product was dried by N$_2$ blowing at 300° F. The filtered product contained 2.7% calcium.

Example 4

Composition B and Composition C of Example 2 were compared for their engine cleanliness properties by subjecting them to an engine test in which the compositions were used to lubricate an EMD-2-567 engine. The latter is a full-scale two-cylinder section of the 16-cylinder railway locomotive engine Model No. 567 of the Electromotive Division of General Motors. Each test was run for a total of 300 hours using a fuel containing 1 wt. percent of sulfur. The following test conditions were employed: 875 r.p.m.; specific fuel consumption, 0.52 lb. per horsepower hour; oil temperature, 240–250° F.; cooling water temperature, 188° F. in, 196° F. out; air intake temperature, 90° F. At the end of each test the pistons of the engine were examined and the various parts were given visual ratings of deposits on a scale of 0 to 10, with 0 representing a clean part with no deposits and 10 representing very heavy deposits. The inspection results are given in Table II. It will be seen from the data that Composition C, which incorporates the additive of the present invention, gave a cleaner engine than Composition B.

TABLE II.—EMD-2-567 ENGINE TEST RESULTS
[Piston demerit ratings after 300 hours]

|  | Composition B | Composition C |
|---|---|---|
| Overall | 1.7 | 1.3 |
| Ring Zone | 2.6 | 2.6 |
| Piston Skirt | 1.0 | 0.1 |
| Piston Underside | 0.3 | 0.0 |
| Compression Ring Sticking | 1.4 | 0.0 |

The examples herein presented are for the purpose of illustrating the invention. It is not intended that the scope of the invention be limited to those examples. Variations within the compass of the appended claims are contemplated.

What is claimed is:

1. In the preparation of a calcium salt of a bridged phenol, wherein said bridged phenol has the formula:

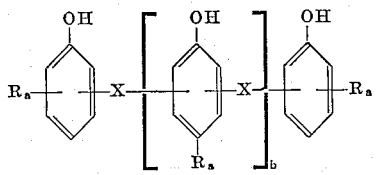

wherein R is a monovalent substituent selected from the group consisting of chlorine atoms, bromine atoms and hydrocarbon groups having from 4 to 18 carbon atoms, $a$ is an integer from 0 to 2, $b$ is an integer from 0 to 10 and X is a divalent bridging group having bridging linkages joined to a bridging atom selected from the group consisting of sulfur and carbon, X being an alkylidene group having from 1 to 16 carbon X being an alkylidene group having from 1 to 16 carbon atoms when the said bridging atom is carbon, the improvement which comprises reacting said bridged phenol with a calcium base selected from the group consisting of calcium oxide and calcium hydroxide, employing in said reaction from 0.5 to 10 equivalents of calcium base for each hydroxy group in said bridged phenol, whereby a portion of the hydroxy groups of said bridged phenol are neutralized, and thereafter reacting said partially neutralized bridge phenol with $Ca(SH)_2$, supplying to the latter reaction from 0.1 to 10 equivalents of $Ca(SH)_2$ for each hydroxy group of said bridged phenol.

2. Improvement as defined by claim 1 wherein X is a divalent bridging group having bridging linkages joined to sulfur.

3. Improvement as defined by claim 1 wherein said bridged phenol is the sulfide of an alkylated phenol having alkyl groups of from 4 to 18 carbon atoms.

4. Improvement as defined by claim 1 wherein said reaction is conducted in the presence of a polar solvent having selected from the group consisting of water and aliphatic alcohols of from 1 to 8 carbon atoms.

5. Improvement as defined by claim 4 wherein said polar solvent is an aliphatic alcohol of 1 to 4 carbon atoms.

6. Improvment as defined by claim 1 wherein said bridged phenol is nonyl phenol sulfide.

References Cited by the Examiner

UNITED STATES PATENTS

| | | | |
|---|---|---|---|
| 2,461,335 | 2/1949 | Mikeska | 260—608 |
| 2,766,291 | 10/1956 | Weissberg et al. | 252—42.7 |
| 2,798,852 | 7/1957 | Wiese et al. | 252—42.7 |
| 2,937,991 | 5/1960 | Carlyle | 252—18 |
| 2,956,018 | 10/1960 | Carlyle et al. | 252—18 |
| 2,971,014 | 2/1961 | Mastin | 252—42.7 |

FOREIGN PATENTS 554,985   3/1958   Canada.

OTHER REFERENCES

Ephraim, Inorganic Chemistry, 4th Ed., 1947, page 527.

CHARLES B. PARKER, *Primary Examiner.*

DANIEL E. WYMAN, *Examiner.*